June 5, 1956 R. H. SMITH 2,749,049
AUTOMOTIVE HEATER BOOSTER

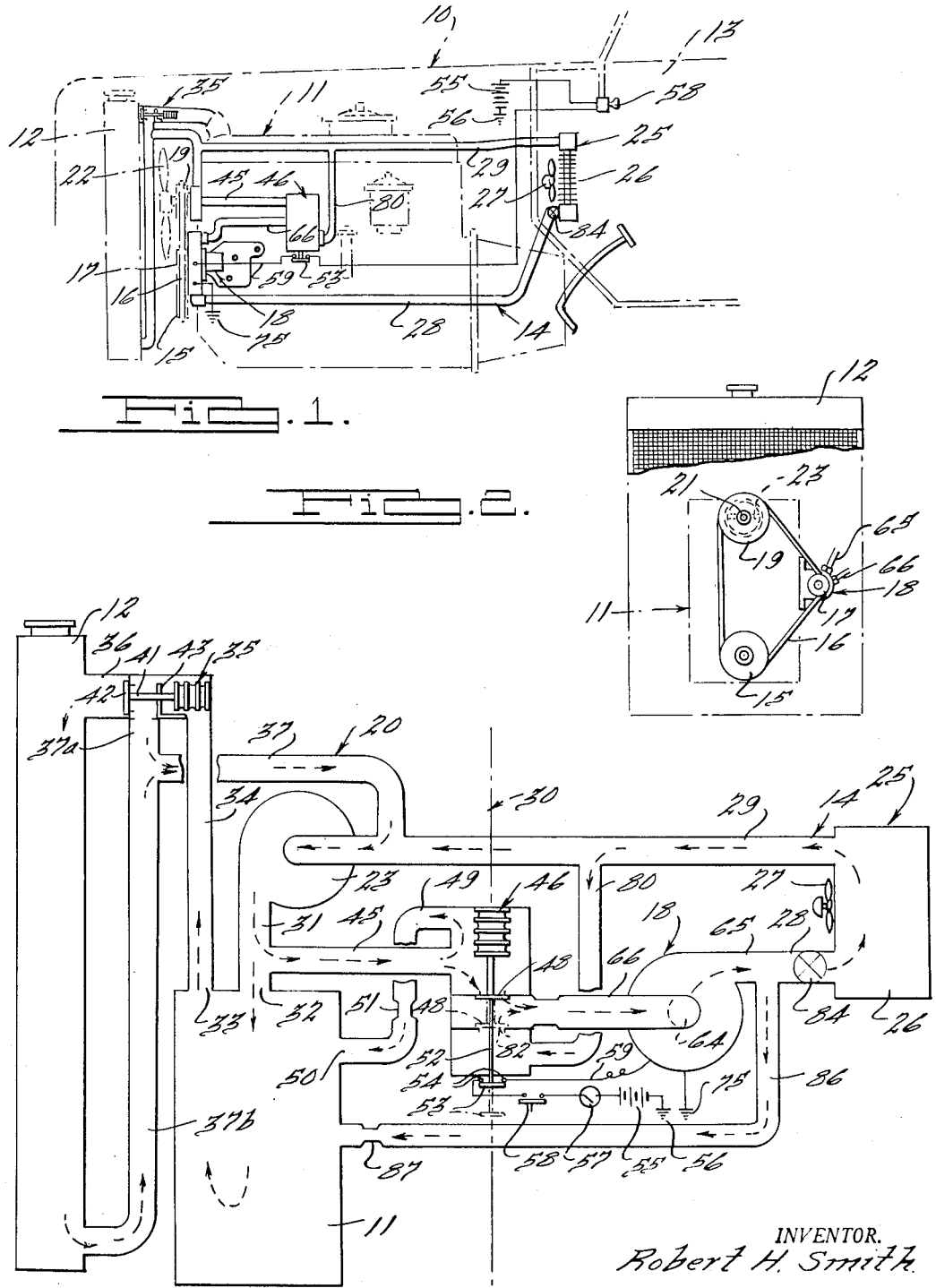

Filed June 28, 1952 4 Sheets-Sheet 2

INVENTOR.
Robert H. Smith
BY
Harness and Harris
ATTORNEYS

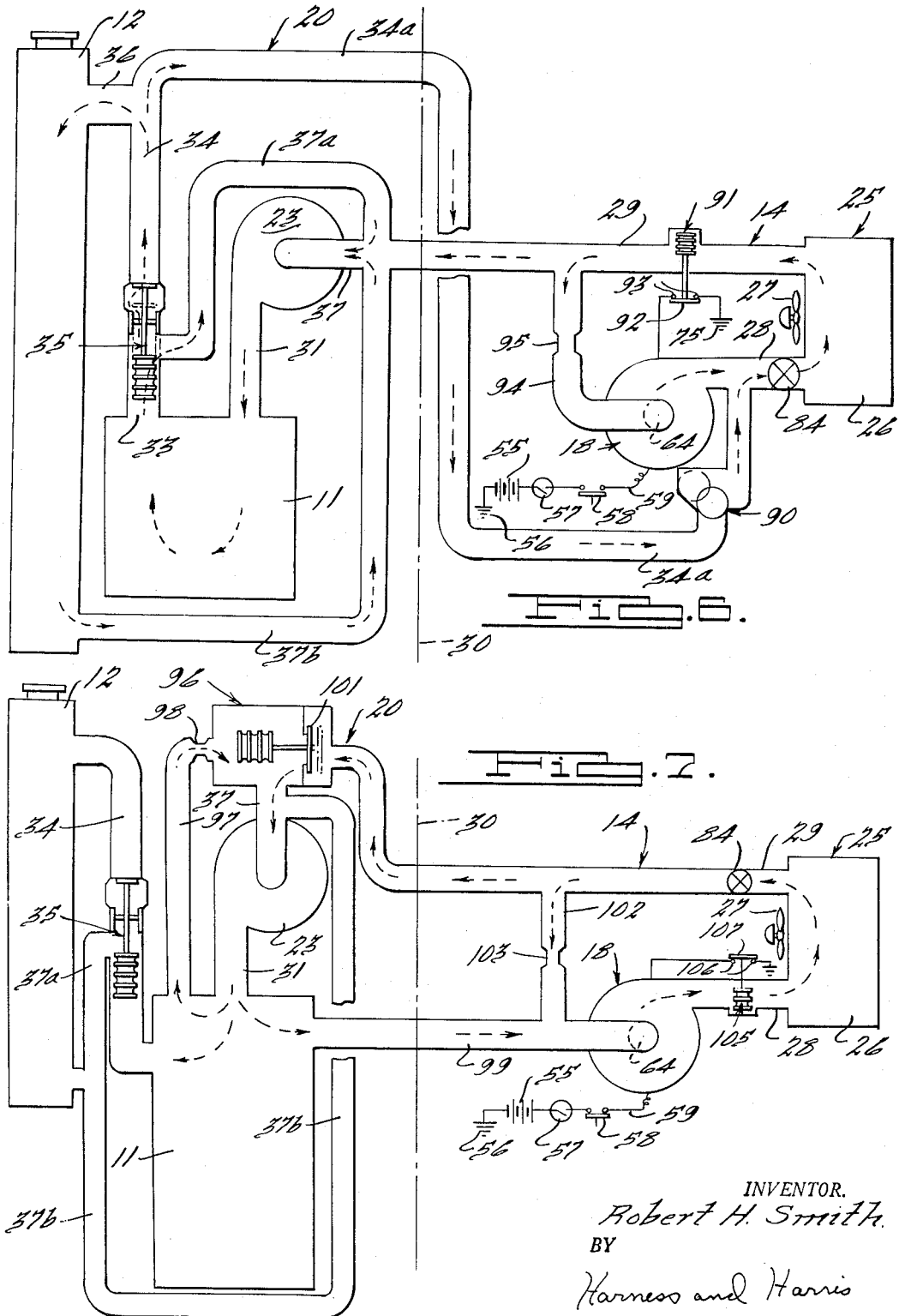

June 5, 1956  R. H. SMITH  2,749,049
AUTOMOTIVE HEATER BOOSTER
Filed June 28, 1952  4 Sheets-Sheet 4

INVENTOR.
Robert H. Smith
BY
Harness and Harris
ATTORNEYS.

United States Patent Office 2,749,049
Patented June 5, 1956

2,749,049
AUTOMOTIVE HEATER BOOSTER

Robert H. Smith, Birmingham, Mich., assignor to Chrysler Corporation, Highland Park, Mich., a corporation of Delaware Application June 28, 1952, Serial No. 296,193

13 Claims. (Cl. 237—8)

This invention relates to heater boosters for liquid circulating heaters and particularly to heaters of this type designed for association with motor vehicle engine liquid cooling systems.

It is a primary object of this invention to provide a liquid circulating heating system for heating the passenger compartment of a motor vehicle which system utilizes a mechanical-electrical energy heat producing means associated with the heater liquid circulating system in such a manner as to insure a quick warm-up of the passenger compartment.

It is another object of this invention to associate an engine driven eddy current or similar power absorption or brake mechanism with the engine liquid cooling system and with the circulating liquid system of the passenger compartment heater such that a small, substantially closed, separate liquid flow circuit is formed between the brake mechanism and the heater so as to provide for quick heater warm-up.

It is a further object of this invention to associate the circulating liquid engine cooling system with a circulating liquid heater system in such a manner that both quick engine warm-up and quick heater warm-up may be efficiently achieved.

It is still another object of this invention to associate a liquid circulating compartment heater with an engine liquid cooling system and with a heater booster such that the compartment heater, the engine cooling system and the heater booster can each be most efficiently and most satisfactorily utilized.

It is still another object of this invention to interconnect the liquid engine cooling system with a liquid heater system by means of thermostatically operable controls such that each of the systems is most advantageously operated.

Other objects and advantages of this invention will become readily apparent from a reading of the description below and a consideration of the related drawings wherein:

Fig. 1 is a side elevational view, partly diagrammatic, of the front end of a motor vehicle that has one form of this invention applied thereto;

Fig. 2 is a front elevation, primarily in outline, of the structure shown in Fig. 1, the view being taken in the direction of the arrow 2 of Fig. 1 with portions of the structure broken away for clarity;

Fig. 3 is a diagrammatic view of the heater and engine cooling systems shown in Figs. 1 and 2;

Fig. 6 is a diagrammatic view of a second form of the invention utilizing a different heater control system from that shown in Fig. 3;

Fig. 7 is another diagrammatic view illustrating a third form of the invention;

Figure 4:
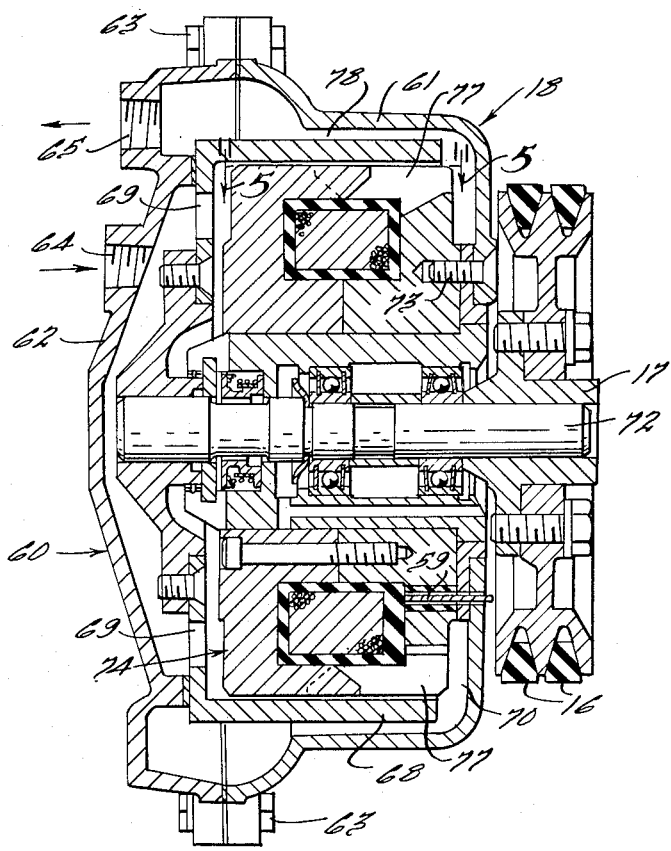
Fig. 4 is an enlarged sectional elevational view of the heater booster device shown in Figs. 1 and 2.

This invention is directed at the provision of means operative as a supplement to the conventional engine heat dissipating liquid heater for quickly heating the passenger compartment of a motor vehicle. This invention provides a quick warm up of the liquid delivered to the heater very soon after the starting of the vehicle engine and prior to the time that the vehicle engine would have an opportunity to normally heat up the liquid in its circulating system which liquid is normally supplied to the heater. The supplemental heater means is herein defined as a heater booster or quick warm up device and is in the form of an eddy current electromagnetic power absorption device or brake having a pair of members one rotatable relative to the other which through the controlled inducement of electrical energy between the relative rotatable members transforms mechanical energy into heat, said heat in turn being extracted therefrom by the liquid to be circulated through the vehicle heater for the quick warm up thereof. The heater booster is preferably driven by an output source of the vehicle engine and is electrically controlled for operation by one or more thermostatic switches arranged in the heater liquid system.

The heater booster, being in the form of an eddy current electromagnetic power absorption mechanism or brake for the basic purpose of providing an efficient means of producing quick heat for a limited amount of water, can be further utilized in its true sense as a power absorption unit or brake for the vehicle by providing a secondary electrical circuit controlled as by the conventional brake pedal of the vehicle, said braking operation imposing a load on the engine through the drive means therefrom associated with the input to the brake.

Heater booster systems of this general type are known as evidenced by U. S. Patent 2,588,507, issued March 11, 1952, to H. J. Findley. However, as will be noted from the Findley Patent 2,588,507, such prior systems have used the heater booster mechanism to heat the liquid circulated through the heater and also to heat all of the liquid passed through the engine cooling system and consequently a very large size heater booster had to be used if any sort of quick heater warm up was expected. Large size heater boosters are costly, heavy, bulky, and a source of noticeable drain on both engine power and the engine electrical system. In a current V-eight engine for motor vehicle drive the engine cooling system will contain 50 to 60 pounds of liquid whereas the heater system will contain but 4 to 6 pounds of liquid. It is thought to be obvious that if merely the liquid in the heater system had to be heated for quick heater warm up that then a much smaller size heater booster mechanism would be required than one that had to heat the combined liquid of the engine cooling system and the heater system. Several forms of this invention are described herebelow.

Referring to the drawings, particularly Figs. 1–3, 10 represents a motor vehicle comprising an engine 11, an engine radiator 12, a passenger compartment 13 that is to be heated, and 14 is generally the liquid heating system for the passenger compartment 13. The engine 11, at its front end, mounts a crankshaft driven pulley 15 that is connected by suitable belt means 16 to the drive pulley 17 of the heater booster device 18. Belt means 16 is also drivingly connected to the drive pulley 19 that is mounted on a shaft 21 that carries the air circulating fan 22 and the water circulating pump 23. While the drawings disclose a separate liquid circulating pump assembly 23, it is possible to utilize the heater booster 18 for both the engine cooling system circulating pump and the heater supplemental heat producing unit under certain circumstances.

The liquid heating system 14 comprises a conventional liquid heater 25 consisting of a liquid circulating core 26 and an air circulating fan 27 adapted to circulate air through the passages in the core 26 to deliver heated air to the passenger compartment 13. The heater core 26 has an inlet conduit 28 and an outlet conduit 29 connected thereto to provide for circulation of heated liquid through the heater core.

Looking at Fig. 3 particularly, it will be seen that the liquid that is to be circulated through the engine cylinder block 11 and radiator 12 to provide for dissipation of engine heat is circulated in one substantially closed system that is denoted 20 and set off to the left side of broken lines 30 in Fig. 3. Likewise, the liquid that is to pass through the liquid heater system 14 is set off to the right side of the broken lines 30 in Fig. 3. The circulating pump assembly 23 forces liquid through conduit 31 and inlet port 32 into the lower portion of the cylinder block 11 where the liquid absorbs heat from the engine and rises through the engine block and leaves the engine block through outlet port 33. From outlet port 33 the liquid in system 20 passes into conduit 34 and up to the thermostatic valve 35 which, depending on the temperature of the liquid, will direct into one or the other of conduits 36 or 37. If the liquid in conduit 33 is relatively cold as when initially starting an engine after a period of shut down then the valve 35 will be positioned as shown and the liquid in conduit 33 will be directed into conduit 37a and thence in conduit 37 which will return the liquid to pump 23 for recirculation through the engine 11. Under such circumstances the liquid in system 20 does not pass through the radiator 12 and consequently its temperature is raised quickly and a fast engine warm-up occurs.

As the temperature of the liquid in system 20 rises, the thermostatic valve 35 causes valve stem 41 to shift towards the left and this raises valve head 42 off its seat and opens conduit 33 to the radiator 12 so that the liquid in system 20 can now be circulated through the radiator 12 to dissipate some of the heat in the system. At the same time that valve head 42 is raised off its seat, the valve head 43, that is carried by valve stem 41, is shifted to the left onto its seat so as to close off connection between conduit 34 and conduit 37a. Accordingly all liquid from conduit 34 is now passed through the radiator 12 and out through branch conduit 37b that returns the liquid to conduit 37 and pump 23 for recirculation through the system.

It will be noted that a portion of the liquid passed to conduit 31 by pump 23 can enter conduit 45 and pass through the thermostatic valve 46. If the liquid is relatively cold, as on initial engine start-up, then the valve 46 will be in the condition shown with the valve head 48 seated. Under such circumstances, the liquid fed to valve 46 by conduit 45 is passed to conduit 49 which connects with the engine cylinder block liquid circulating system at some point 50 between the inlet port 32 and outlet port 33. The point of connection 50 is preferably located where the pressure of the engine cooling liquid is such that there will be flow from the engine system 20 to the thermostatic control valve 46. A restriction orifice 51 may be placed in conduit 49 to prevent excessive flow through conduit 49.

If valve 46 is closed, as shown in Fig. 3, then the liquid in the heater system 14 is restricted to the substantially closed circuit shown at the right of Figure 3 and thus the liquid in the heater circuit is not commingled with the liquid in the engine cooling circuit 20. It will be noted that valve 46 has a valve stem 52 that not only carries valve head 48 but also carries the switch contact member 53. When valve 46 is in the position shown, corresponding to an engine start up condition, then contact 53 is engaged with switch contacts 54. Switch contacts 53, 54 form part of the electrical circuit that controls the electromagnetic eddy current brake mechanism 18 that is subsequently described. The brake control circuit comprises a battery 55 that has one terminal grounded at 56 and the other terminal connected through the conventional ignition switch 57 to the heater control switch 58. Control switch 58 is connected through contacts 53, 54 to the conductor 59 that feeds the coil 74 (see Fig. 4) of the eddy current brake 18. Thus, when valve 46 is in the engine start position shown in Fig. 3, the contacts 53, 54 are closed and if heat is desired from the heater 25 then the heater control switch 58 can be closed and this will energize the eddy current brake heater booster 18 so that the liquid circulated through the heater system 14 will be immediately heated and thus heat is immediately available for the passenger compartment 13.

The heater booster 18, see Fig. 4 particularly, comprises a drum-like casing 60 formed in two parts that are connected together by bolts 63. Casing 60 is adapted to be fixedly mounted on the engine block as shown in Fig. 2. Casing part 62 has an inlet opening 64 and an outlet opening 65. Liquid in the conduit 66 of the heater system 14 (see Fig. 3) is passed into the eddy current brake casing interior through inlet 64 and is circulated across heated portions of the eddy current brake and expelled from the casing through the outlet 65 from where it is directed into conduit 28 (see Fig. 3) that is the inlet to the core 26 of heater 25.

Figure 5:
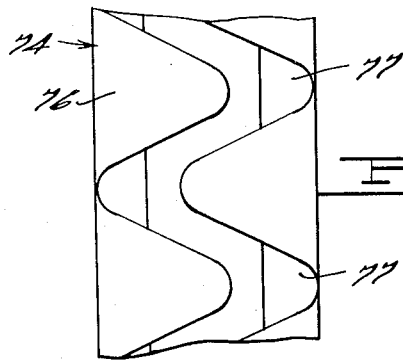
Fig. 5 is a fragmentary plan elevation of the periphery of the heater booster coil.

The eddy current brake forming the heater booster unit 18 is not, per se, a part of this invention and, as brakes of this type are known, only a brief description will be given of the heater booster 18. Rotatably mounted within the casing part 62 is a cup-shaped armature member 68. Armature member 68 has openings 69 piercing it that permit liquid to pass from the inlet 64 on the one side of member 68 to the chamber 70 on the other side of the armature member 68. Armature 68 is drivingly connected to the shaft 72 that mounts the pulley 17 that is driven by the belt means 16. The casing part 61 has connected thereto by bolts 73 the coil element 74. Coil element 74 has one end thereof connected to the conductor 59 of its control circuit and the other end of coil 74 is grounded as shown at 75 in Fig. 3. Coil element 74 has its peripheral surface 76 (see Fig. 5) cut by a series of channel-like formations 77 that extend from edge to edge thereof. Liquid passing from casing inlet 64 through openings 69 in the armature member 68 can pass along channels 77 and into the chamber 70 and then leave the chamber 70 by reversing the direction of flow and passing axially towards the left through the open channel 78 that extends between the outer side of the armature 68 and the inner side of the casing part 61. Liquid passing through the channel 78 towards the left is directed to the outlet opening 65 in casing 60 from whence it passes out into the inlet 28 to liquid heater 25. It has been found that the rotation of the cup-shaped armature 68 within the casing 60 provides a pump action that readily forces the liquid from the casing inlet 64 through the coil channels 77 and back through channel 78 to the outlet 65. This pump action of the rotatable armature 68 is utilized to circulate the liquid through the heater system 14 and thus the engine cooling system 20 may be closed off from the heater system 14 without interfering with the circulation of liquid through the heater system.

Now looking at Fig. 3 again, it will be noted that at engine start valve head 48 is seated and liquid in the heater system 14 can pass from conduit 66 through the heater booster 18 and thence through conduit 28 to the heater core 26. After passing through the heater core 26 and giving up a portion of its heat content the liquid passes through conduit 29 to the conduit 80 which latter conduit returns it to valve 46 from whence it can be recirculated through conduit 66 to the heater booster 18.

When the liquid circulating through the engine cooling system 20 has reached a sufficiently high temperature to cause the valve 46 to effect unseating of valve head 48 then the valve stem 52 is moved downwardly and this simultaneously opens the heater booster control contacts 53, 54. Thereafter the heater booster 18 is de-energized and the heat for the heater core 26 must be derived from the liquid circulating through the engine cooling system 20. Such is now possible for with the unseating of valve head 48 the liquid in conduit 45 can now flow through valve 46 into conduit 66 and be circulated through the heater core 26 and thence back to the pump assembly 23 by way of conduit 29. Liquid in conduit 29 does not enter conduit 80 at this time for valve head 48 has been moved to the broken line position shown in Fig. 3 where it closes port 82.

Conduit 28 that provides the hot liquid supply to the heater core 26 may contain a manually operable shut off valve 84. There may also be provided a branch conduit 86 that is connected between heater supply conduit 28 and the engine 11. Branch conduit 86 may contain a restriction orifice 87. Branch conduit 86 provides a bleed back conduit to provide for circulation of liquid through the heater booster 18 even when valve 84 is closed. This will prevent the building up of heated fluid in the heater booster and also excessive turbulence due to the armature 68 rotating in a substantially closed container of liquid. Booster deterioration and engine friction losses are thus reduced.

It is thought to be apparent from the above description of the form of this invention that is shown in Figs. 1–3 that the heater booster device 18 need only heat a relatively small quantity of liquid and that this liquid that is circulated through the heater system on initial engine start can be heated quickly and positively circulated through the heater system 14 by the pump action of the eddy current heater booster device 18. Furthermore, the thermostatic control valve 46 not only automatically controls the liquid circulated through the heater system but in addition it automatically limits the time of operation of the eddy current heater booster device 18 to the minimum time necessary to insure a quick, continuous supply of relatively high temperature heat.

In Fig. 6 is shown diagrammatically another form of the invention that has been disclosed in Figs. 1–3. All elements of these two forms of the invention that are identical carry the same reference numerals. The type and arrangement of the controls of the circuit shown in Fig. 6 is the primary difference between this form of the invention and that shown in Fig. 3. The engine cooling system 20 to the left of line 30 is substantially identical to that shown in Fig. 3 except for the branch conduit 34a that branches off the radiator supply line 34. When thermostatic valve 35 is open to permit liquid to flow through conduit 34 to the radiator 12 from the engine 11, then a portion of this engine heated liquid flowing through conduit 34 is bled off from conduit 34 by the branch conduit 34a and directed to the heater supply conduit 28. Located in the branch conduit 34a is a one-way gravity actuated valve 90 which is shown to be of the ball type although any other equivalent type of valve could be used. Whenever thermostatic valve 35 is closed, as during a cold start, to prevent the flow of engine heated liquid through the line 34 and branch line 34a, then valve 90 is seated as shown in full lines. At this time the heater system 14 to the right of line 30 will be arranged to circulate liquid heated by the heater booster device 18 from the booster 18 through conduit 28 and valve 84 to the heater core 26 thence through the core 26 and out through conduit 29 to the return conduit 94 and then back to the heater booster 18. Conduit 94 contains a restriction 95 that tends to restrict flow in return conduit 94. It will be noted that a thermostatically operated switch control 91 is located in the heater outlet conduit 29. This switch automatically opens switch contacts 92, 93 when the liquid leaving the heater reaches a predetermined relatively high temperature. Thermostatic switch 91 is set to de-energize the heater booster coil 74 at a time slightly before the radiator thermostat 35 opens to direct flow of the engine heated liquid through the radiator 12. If the thermostat 35 is set to open at about 150°–160° F. then switch 91 would open when the heater system fluid is at about 145° F. Switch contacts 92, 93 are located in the control circuit for the energization of the heater booster 18 and thus the switch 91 automatically controls the time of operation of the heater booster 18 and also serves as a safety switch to control the temperature of the liquid circulated through the heater system 14.

When the radiator control thermostatic valve 35 opens to permit the engine heated liquid to flow through the radiator 11, then some of this engine heated liquid is bled through the conduit 34a and it forces valve 90 off its seat to the broken line position shown in Fig. 6. With valve 90 unseated the engine heated liquid is now circulated through the heater core 26 along with the liquid heated by the heater booster 18. When the temperature of the heater circulating liquid is raised by booster 18 to a predetermined temperature such as 145° F., then thermostatic switch 91 will cause contacts 92, 93 to open and de-energize the booster coil 74. Subsequently the thermostat 35 will open and the engine heat can be used to heat the heater liquid. If the temperature of the liquid circulating through the heater should drop to say 145° F., then thermostatic switch 91 will automatically close the contacts 92, 93 and bring about energization of the booster coil 74 to supplement the heat supply from the engine circulating liquid.

The form of the invention shown in Fig. 6 is somewhat simpler in design than that shown in Fig. 3 and in addition has a safety control that is an advantageous feature.

In Fig. 7 is shown a third form of the invention that places the heater booster control valve 96 such that the heater booster is pressurized during its energized period. Pressurizing the heater booster tends to eliminate cavitation in the booster. In the Fig. 7 form of the invention all elements that are identical to the elements described with relation to the Fig. 3 form of the invention carry the same reference numerals. The engine cooling system 20 on the left of the broken line 30 is quite similar to that shown in Figs. 3 and 6. Liquid from pump 23 is passed through conduit 31 to the engine 11 and leaves engine 11 by way of conduit 34. Conduit 34 contains a thermostatic valve 35 that when closed, as shown, prevents the engine circulating liquid from passing through radiator 12 and instead diverts this engine circulating liquid into bypass conduit 37a from whence it flows to conduit 37b that returns it to the pump 23 for recirculation through the engine 11. Also connected with the engine circulating liquid system 20 is a thermostatically operated heater system control valve 96. A branch conduit 97 is connected between the engine 11 and the control valve 96 such that it is arranged to bleed heated engine liquid from the engine liquid cooling system. Branch conduit 97 contains a restriction 98 to somewhat restrict flow through the bleed conduit 97.

Also connected to the engine liquid circulating system is a conduit 99 that connects with the inlet 64 to the heater booster 18. Heater booster 18 discharges into heater core inlet 28 and the liquid circulated through heater core 26 discharges into conduit 29. Conduit 29 connects with the control valve 96 such that when valve head 101 is moved to the open position shown in broken lines then liquid from the heater system can be recirculated through the engine to absorb heat. Heater discharge conduit 29 is connected to heater inlet conduit 28 by means of the connector line 102. Line 102 contains a restriction 103 that tends to restrain passage of liquid between lines 29 and 28.

On cold engine start thermostat 35 is closed as shown and control valve 96 is also closed as shown. The engine cooling liquid is circulated through the engine system 20 without going through the radiator 12. At the same time, the heater booster 18 will be energized for the thermostatic control switch 105 will close contacts 106, 107 that automatically control the electrical circuit for the heater booster coil 74. Heater booster 18 will thus heat and circulate liquid through heater circuit 14 on initial engine start. As the temperature of the liquid in the heater system 14 is raised to say 145° F. the switch control 105 will open contacts 106, 107 and subsequently when the temperature of the engine cooling liquid reaches about 150°, the thermostatic control valve 96 will unseat valve head 101 to its broken line position and also open radiator thermostat 35. Thereafter, the liquid in the engine cooling system 20 will be circulated through both the radiator 12 and the heater system 14 so that engine heat can be utilized to heat the passenger compartment. The restriction 103 in line 102 tends to prevent recirculation of liquid of the heater system without first passing such liquid through the engine to absorb heat therefrom. The form of the invention shown in Fig. 7 provides a pressurized heater with a thermostatic control that also functions as a safety control.

Figure 8:
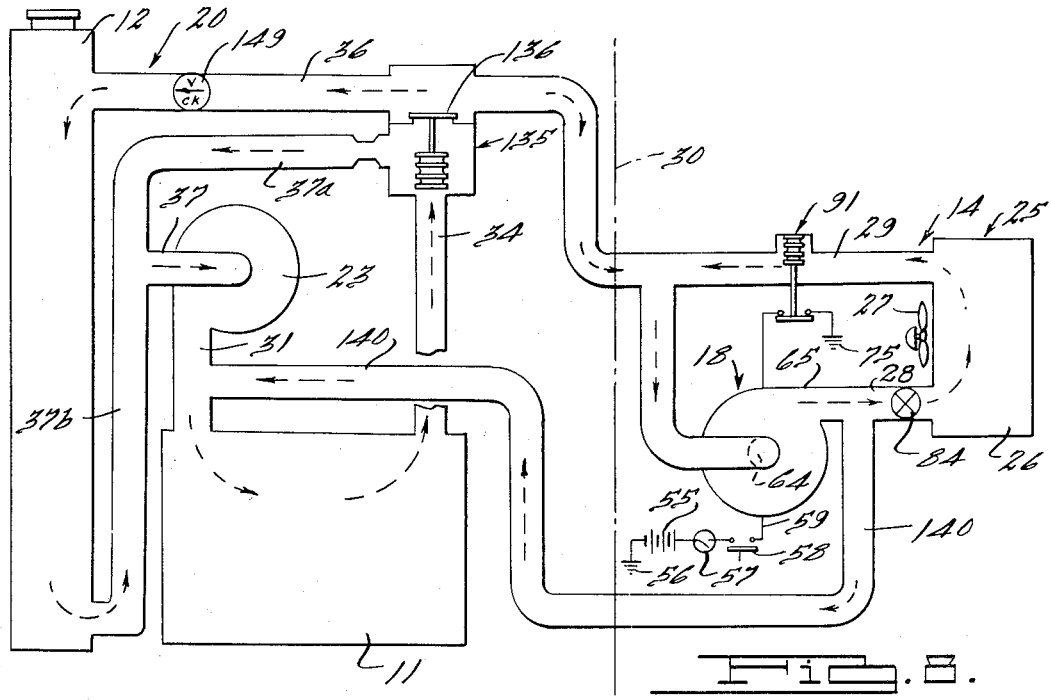
Fig. 8 is another diagrammatic view of a fourth form of this invention.

In Fig. 8 is shown a fourth form of the invention wherein the heater booster 18 and its connected conduits are so associated with the engine circulating liquid system 20 that the pumping action of the heater booster 18 may be utilized to circulate liquid through both the engine cooling system 20 and the heater system 14. By this arrangement the engine liquid circulating pump 23 and the heater booster pump can both be of minimum size for each of these pumps supplements the other when the heating and cooling systems are connected for circulation of engine liquid through the heater. When the engine 11 is started cold then thermostatic valve 135 has valve head 136 seated as shown and the liquid leaving engine 11 by way of conduit 34 is passed through conduit 37 and then back to the pump 23 for recirculation through the engine without going through the radiator 12. Pump 23 at this time has to circulate only a relatively small amount of liquid so it can be of a relatively small size. Likewise, when valve head 136 is seated, the booster 18 has to circulate only a relatively small amount of liquid through the heater system 14 and thus the heater booster can also be of a minimum size. After the booster device 18 has raised the temperature in the heater system 14 sufficiently to cause the thermostatic control switch 91 to de-energize the booster coil 74, then the thermostatically controlled valve 135 will unseat the valve head 136 and permit the engine cooling liquid to circulate through the radiator. At this time additional load will be placed on pump 23 however. It will be noted that heater booster 18, that is continuously driven by the engine, has its outlet 65 connected to the heater inlet conduit 28 and also to a branch conduit 140. Branch conduit 140 connects the booster discharge 65 to the discharge conduit 31 that leads from the engine liquid circulating pump 23 to the engine 11. It will be noted that the conduit 36 contains a check valve 149 that restricts flow through the radiator to its intended direction. Accordingly, a part of the liquid pumped by booster 18 is circulated through the engine 11, as a result of the specific arrangement of the branch conduit 140, and thus the pumping action of booster 18 supplements that of pump 23 when the load on pump 23 is increased due to the radiator entering the engine system 20. As in the form of this invention shown in Fig. 6, the thermostatic control 91 that is located in heater discharge line 29, provides a safety device for the heater system 14 as well as an automatic energization control for the heater booster electrical circuit.

Figure 9:
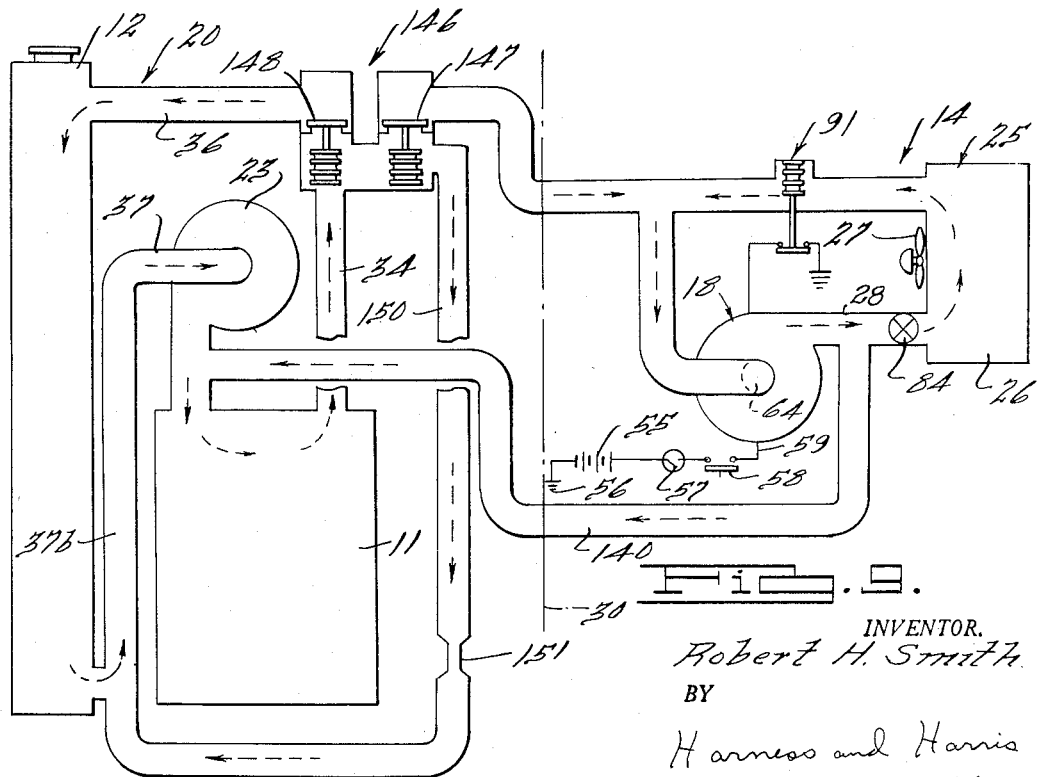
Fig. 9 is another diagrammatic view of a fifth form of this invention.

Fig. 9 shows a fifth form of the invention which is quite similar to the form shown in Fig. 8 but differs in one respect from that shown in Fig. 8. Instead of the single thermostatic control valve 135 of Fig. 8, a double thermostatic control valve mechanism 146 is used and it is placed in the same relative location in the engine cooling system 20 as the valve 135. A branch conduit 150 is included in the system shown in Fig. 8 and this branch conduit 150 is connected between the valve unit 147 of the double valve mechanism 146 and the inlet conduit 37b to the engine liquid circulating pump 23. With the double thermostatic control valve mechanism 146, it is possible to have valve unit 148 control the liquid circulation through the radiator 12 while valve unit 147 controls the interconnection of the engine circulating system 20 with the heater system 14. When the systems 14 and 20 are interconnected, as when valve units 147 and 148 are both open, then the restriction 151 in branch conduit 150 tends to restrain flow through the branch conduit 150. However, due to the pair of valve units 147 and 148, the times when the radiator 12 is brought into the engine cooling circuit 20, and when the heater system 14 and engine cooling system 20 are interconnected, can be different rather than simultaneous as was the case with the Fig. 8 system. Accordingly, when only one of the valve units 147 or 148 is open, then the branch conduit 150 provides a bleed line to return a portion of the engine cooling liquid to the pump 23 without first circulating this liquid to other portions of the engine system 20 or the heater system 14.

I claim:

1. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the pump intake providing a first closed circuit to circulate the engine cooling liquid through said engine without passing through said radiator, and a first thermostatically operated valve connected to said first system at a location to selectively control the passage of the engine cooling liquid through said first system and through said first closed circuit, said heating system comprising a heater core having inlet and outlet conduits connected to said first system, said inlet conduit being connected to said first conduit system at a location whereby fluid flow from said first system to said heater core is also controlled by said first valve, said outlet conduit being connected to said first system on the intake side of said pump, conduit means connecting the inlet and outlet conduits of said heater core to provide a second liquid circulating system that permits circulation of liquid through said heater without circulation through said first system, a heater booster connected to the heater core inlet conduit in said second system to warm the liquid passing therethrough, and a second liquid circulating pump connected to said second system operable to circulate liquid therethrough.

2. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the pump intake providing a first closed circuit to circulate the engine cooling liquid through said engine without passing through said radiator, and a first thermostatically operated valve connected to said first system between the by-pass conduit and the radiator to selectively control the passage of the engine cooling liquid through said first system and through said first closed circuit, said heating system comprising a heater core having inlet and outlet conduits connected to said first system, said inlet conduit being connected to said first system on the discharge side of said pump between said first valve and said radiator whereby fluid flow from said first system to said heater core is also controlled by said first valve, said outlet conduit being connected to said first system on the intake side of said pump, conduit means connecting the inlet and outlet conduits of said heater core to provide a second liquid circulating system that permits circulation of liquid through said heater without circulation through said first system, a heater booster connected to the heater core inlet conduit in said second system to warm the liquid passing therethrough, a second liquid circulating pump connected to said second system operable to circulate liquid therethrough, and thermostatically operated controls located in said second system to automatically control operation of said heater booster.

3. A circulating fluid heating system for a compartment of a motor vehicle that includes a liquid cooled engine having a radiator and a liquid circulating pump operably connected thereto by conduit means providing a first liquid circulating system that permits the circulation of the engine cooling liquid from the engine through the radiator and back to the engine, a bypass conduit connecting the engine with the pump intake providing a first closed circuit to circulate the engine cooling liquid through said engine without passing through said radiator, and a first thermostatically operated valve connected to said first system to selectively control the passage of the engine cooling liquid through said first system and through said first closed circuit, said heating system comprising a heater core having inlet and outlet conduits connected to said first systm, said inlet conduit being connected to said first conduit system on the discharge side of said pump and said outlet conduit being connected to said first system on the intake side of said pump, conduit means interconnecting the inlet and outlet conduits of said heater core between said pump and said heater core to provide a second liquid circulating system that permits circulation of liquid through said heater without circulation through said first system, a heater booster and pump means connected to the heater inlet conduit of said second system to warm and circulate liquid therein independently of the liquid heating and circulating means of said first system, and a thermostatically operated flow control valve responsive to the temperature of the liquid circulating through said first system to control connection of the liquid circulating in said first system to the inlet conduit to said heater core.

4. A circulating fluid heating system for a compartment of a motor vehicle that includes a liquid cooled engine having a radiator and a liquid circulating pump operably connected thereto by conduit means providing a first liquid circulating system that permits the circulation of the engine cooling liquid from the engine through the radiator and back to the engine, a bypass conduit connecting the engine with the pump intake providing a first closed circuit to circulate the engine cooling liquid through said engine without passing through said radiator, and a first thermostatically operated valve connected to said first system to selectively control the passage of the engine cooling liquid through said first system and through said first closed circuit, said heating system comprising a heater core having inlet and outlet conduits connected to said first system, said inlet conduit being connected to said first conduit system on the discharge side of said pump and said outlet conduit being connected to said first system on the intake side of said pump, conduit means interconnecting the inlet and outlet conduits of said heater core between said pump and said heater core to provide a second liquid circulating system that permits circulation of liquid through said heater without circulation through said first system, a heater booster and pump means connected to the heater inlet conduit of said second system to warm and circulate liquid therein independently of the liquid heating and circulating means of said first system, and a second thermostatically operated valve responsive to the temperature of the liquid circulating in said first system connected to said first system to provide for selective interconnection of said first and second system whereby the engine cooling liquid of said first system can be circulated through said heater core.

5. A circulating fluid heating system as set forth in claim 4 wherein said heater booster means is electrically operated and said second thermostatically operated valve has electric circuit control means associated therewith and with said booster such that movement of said second thermostatically operated valve to a position to interconnect said first and second systems causes de-activation of said booster.

6. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the first pump intake providing a first closed circuit to circulate the engine cooling liquid through said engine without passing through said radiator, and a first thermostatically operated valve connected to said first system between the bypass conduit and the radiator to selectively control the passage of the engine cooling liquid through said first system and through said first closed circuit, said heating system comprising a heater core having inlet and outlet conduits connected to said first system, said inlet conduit being connected to said first liquid circulating system on the discharge side of said first pump between said first valve and said radiator whereby fluid flow from said first system to said heater core is also controlled by said first valve, said outlet conduit being connected to said first system on the intake side of said first pump, conduit means connecting the inlet and outlet conduits of said heater core to provide a second liquid circulating system that permits circulation of liquid through said heater without circulation through said first system, a heater booster and a second pump connected to the heater core inlet conduit of said second system to warm and circulate the liquid in said second system, and a one-way valve mounted in the heater core inlet conduit to insure that said second pump circulates the liquid from the said inlet conduit directly through said heater core.

7. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the first pump intake providing a first closed circuit to circulate the engine cooling liquid through said engine without passing through said radiator, and a first thermostatically operated liquid flow control valve connected to said first system to selectively control the passage of the engine cooling liquid through said first system and through said first closed circuit, said heating system comprising a heater core having inlet and outlet conduits connected to said first liquid circulating system, said inlet conduit being connected to said first system on the discharge side of said first pump and said outlet conduit being connected to said first system on the intake side of said first pump, branch conduit means interconnecting the inlet and outlet conduits of said heater core to provide a second liquid circulating system that permits circulation of liquid through said heater without circulation through said first system, an electrically operated heater booster and a second pump connected to the inlet conduit of said heater core of said second system to warm and circulate the liquid in said second system independently of the liquid heating and circulating means of said first system, and a second thermostatically operated liquid flow control valve responsive to the temperature of the liquid circulating in the first system connected in the outlet conduit of said heater core between said branch conduit connection and the intake to said first pump to control the admittance of liquid from said first system to said heater core.

8. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the first pump intake providing a first closed circuit to circulate the engine cooling liquid through said engine without passing through said radiator, and a first thermostatically operated liquid flow control valve connected to said first system to selectively control the passage of the engine cooling liquid through said first system and through said first closed circuit, said heating system comprising a heater core having inlet and outlet conduits connected to said first liquid circulating system, said inlet conduit being connected to said first system on the discharge side of said first pump and said outlet conduit being connected to said first system on the intake side of said first pump, branch conduit means interconnecting the inlet and outlet conduits of said heater core to provide a second liquid circulating system that permits circulation of liquid through said heater without circulation through said first system, an electrically operated heater booster and a second pump connected to the inlet conduit of said heater core of said second system to warm and circulate the liquid in said second system independently of the heating and circulating means for the liquid of the first system, a second thermostatically operated liquid flow control valve responsive to the temperature of the liquid circulating in the first system connected in the outlet conduit of said heater core between said branch conduit connection and the intake to said first pump, and a flow restriction in said branch conduit means.

9. A circulating fluid heating system as set forth in claim 8 wherein said inlet conduit of said heater core on the discharge side of said second pump includes a thermostatically operated electrical switch of an electrical circuit that controls operation of said heater booster.

10. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the intake to the first pump providing a first closed circuit to circulate the engine cooling liquid through said engine without passing through said radiator, and a first thermostatically operated liquid flow control valve connected to said first system to selectively control the passage of the engine cooling liquid through said first system and through said first closed circuit, said heating system comprising a heater core having inlet and outlet conduits connected to said first system, said inlet conduit being connected to said first liquid circulating system on the discharge side of said first pump and said outlet conduit being connected to said first system on the intake side of said first pump, conduit means connecting the inlet and outlet conduits of said heater core to provide a second liquid circulating system that permits circulation of liquid through said heater without circulation through said first system, an electrically operated heater booster and a second pump connected to the heater inlet conduit in said second system to warm and circulate the liquid passing through said heater core, a second thermostatically operated liquid flow control valve connected to the inlet conduit of said heater core on the intake side of said second pump, a branch conduit interconnecting said second thermostatically operated liquid flow control valve responsive to the temperature of the liquid circulating in the first system and the intake side of said first pump, and a bypass conduit interconnecting the discharge side of said second pump to the discharge side of said first pump.

11. A circulating fluid heating system for a compartment of a motor vehicle that includes a liquid cooled engine having a radiator and a first liquid circulating pump operably connected thereto by conduit means providing a first liquid circulating system that permits the circulation of the engine cooling liquid from the engine through the radiator and back to the engine, a bypass conduit connecting the engine with the pump intake to the first pump providing a first closed circuit to circulate the engine cooling liquid through said engine without passing through said radiator, and a first thermostatically operated valve connected to said first system between the bypass conduit and the radiator to selectively control the passage of the engine cooling liquid through said first system and through said first closed circuit, said heating system comprising a heater core having inlet and outlet conduits connected to said first system, said inlet conduit being connected to said first liquid circulating system on the discharge side of said first pump between said first valve and said radiator whereby fluid flow from said first system to said heater core is also controlled by said first valve, and said outlet conduit being connected to said first system on the intake side of said first pump, conduit means connecting the inlet and outlet conduits of said heater core to provide a second liquid circulating system that permits circulation of liquid through said heater without circulation through said first system, an electrically operated heater booster and a second pump connected to the heater inlet conduit in said second system to independently warm and circulate the liquid passing through said heater core, a bypass conduit connecting the discharge side of said second pump to the discharge side of said first pump, and a one-way check valve in said first system to restrict flow through said radiator to one direction.

12. A circulating fluid heating system as set forth in claim 2 wherein said heater booster controls are located in the outlet conduit of said heater core to provide a heater booster safety control.

13. A circulating fluid heating system as set forth in claim 2 wherein said heater core inlet conduit includes a one-way valve to restrict fluid flow from said second system to said first system to the heater core outlet conduit.

References Cited in the file of this patent

UNITED STATES PATENTS

| | | |
|---|---|---|
| 1,409,072 | Vincent | Mar. 7, 1922 |
| 1,791,756 | Fay | Feb. 10, 1931 |
| 2,038,193 | Parsons | Apr. 21, 1936 |
| 2,072,763 | Mayo | Mar. 2, 1937 |
| 2,300,011 | Rose | Oct. 27, 1942 |
| 2,588,507 | Findley | Mar. 11, 1952 |
| 2,599,585 | Rohen | June 10, 1952 |

FOREIGN PATENTS

| | | |
|---|---|---|
| 767,631 | France | May 7, 1934 |